United States Patent [19]
Gatto et al.

[11] Patent Number: 5,466,922
[45] Date of Patent: Nov. 14, 1995

[54] DEVICE FOR ANALYZING INFORMATION CARRIERS PROVIDED WITH MEANS OF COMPENSATION OF ITS OUTPUT SIGNALS

[75] Inventors: Jean-Marie Gatto; Dominique Bertrand, both of Paris, France

[73] Assignee: Internationale Des Jeux, France

[21] Appl. No.: 258,865

[22] Filed: Jun. 13, 1994

[30] Foreign Application Priority Data

Jun. 29, 1993 [FR] France .................. 93 07916

[51] Int. Cl.[6] ........................................ G01J 1/32
[52] U.S. Cl. ........................ 250/208.1; 250/205
[58] Field of Search .................. 250/208.1, 556, 250/559, 208.4, 214.1, 214 LS, 569, 566, 205; 382/7, 11, 65

[56] References Cited

U.S. PATENT DOCUMENTS

| | | | |
|---|---|---|---|
| 3,800,078 | 3/1974 | Cochran et al. | 178/7.1 |
| 5,032,712 | 7/1991 | Ito | 250/208.1 |
| 5,189,290 | 2/1993 | Tsutsui | 250/569 |

FOREIGN PATENT DOCUMENTS

| | | |
|---|---|---|
| 0180391A3 | 5/1986 | European Pat. Off. . |
| 3409818A1 | 3/1984 | Germany . |
| 2018483 | 10/1979 | United Kingdom . |

Primary Examiner—Edward P. Westin
Assistant Examiner—Que T. Le
Attorney, Agent, or Firm—Sterne, Kessler, Goldstein & Fox

[57] ABSTRACT

Device for analyzing information carriers comprising an image detector (1) including, in a housing (9), a series of light sources (10) with each of which is associated a photosensitive element (16) with the light sources (10) and the photosensitive elements (16) arranged in two rows along the length of the image detector (1). The device also includes a threshold voltage source (6) and a comparator (5) for comparing the output signals from each of the photosensitive elements (16) with a threshold voltage (Vs) of the voltage source (6). Moreover, the device includes a compensation circuit (20, 21, 22, 23, 24, 25) for varying at least one of the parameters comprising the output signal of each photosensitive element (16), the threshold voltage (Vs), and the intensity of the light signal emitted by the associated light source (10) in order to obtain a uniform response from all the photosensitive elements (16) of the image detector (1).

11 Claims, 4 Drawing Sheets

DEVICE FOR ANALYZING INFORMATION CARRIERS PROVIDED WITH MEANS OF COMPENSATION OF ITS OUTPUT SIGNALS

BACKGROUND OF THE INVENTION

1. Field of the Invention

The present invention relates to devices for analyzing information carriers and refers more particularly to such devices used in particular for reading gaming coupons or receipts in terminals for making bets such as lottery bets, lotto, totalizators or the like.

2. Related Art

These devices for analyzing information carriers generally include an image detector arranged facing a roller for driving a document to be analyzed. The image detector generally includes a row of light-emitting diodes, their number depending on the horizontal resolution and on the luminous intensity which are required. With these diodes are associated light focusing and filtering modules intended for focusing the beams from the diodes onto a transparent wall of the housing of the detector, against which wall is to be applied the face of the document to be analyzed which bears on the one hand fixed inscriptions such as a gaming grid, indices for the boxes of the grid, date indications and the like and on the other hand variable inscriptions made by the player in the gaming grid as well as fixed inscriptions such as alignment tags, a code relating to the type of game to which the coupon belongs.

Facing the region for focusing the beams emitted by the light-emitting diodes are arranged light conductors for transmitting the beams to photosensitive elements.

Assuming that the light-emitting diodes all emit a light beam of like intensity, and that the photodetectors all deliver equal response signals, an identical output level is obtained for each light-emitting diode/photosensitive element pair.

Now, it has been observed that neither the light sources or light-emitting diodes, nor the photosensitive elements of an image detector are perfect in the sense indicated above.

In a gaming terminal, it is necessary to read the crosses made by the players on coupons with the aid of a so-called "color blind" reading device, operating on the principle of all-or-nothing contrast detection.

Assuming that a predetermined output voltage threshold Vs is fixed in respect of the photosensitive elements, if the response of a photosensitive element is below Vs, it is accepted that a black image element or pixel is involved on the document read.

If on the contrary the response of the photosensitive element is above the threshold Vs, the relevant pixel is "white".

It is therefore very important that the response of all the photosensitive elements of an image reading device used in a gaming terminal be uniform despite the differences in sensitivity of the photosensitive elements and the differences between luminous intensities emitted by the sources or light-emitting diodes associated with the said photosensitive elements.

SUMMARY OF THE INVENTION

The invention aims to create a device of the aforesaid type for analyzing information carriers, the response of which is as homogeneous as possible throughout its range.

Its subject is therefore a device for analyzing information carriers comprising an image detector including, in a housing, a series of light sources with each of which is associated a photosensitive element, the light sources and the photosensitive elements being arranged in two rows along the length of the image detector, the device furthermore comprising a threshold voltage source and means for comparing the output signals from each of the photosensitive elements with the threshold voltage of the said source, characterized in that it moreover includes compensation means for varying at least one of the parameters comprising the output voltage of each photosensitive element, the threshold voltage Vs and the intensity of the light signal emitted by the associated source in order to obtain a uniform response from all the photosensitive elements of the reading device.

According to another particular characteristic of the invention, the said compensation means comprise at least one memory for storing correction values for one at least of the said parameters relating to each light source/photosensitive element pair and means for modifying the said at least one parameter as a function of the corresponding correction values contained in the said memory.

BRIEF DESCRIPTION OF THE FIGURES

The invention will be better understood with the aid of the description which will follow, given merely by way of example and provided with reference to the attached drawings, in which.

DETAILED DESCRIPTION OF THE PREFERRED EMBODIMENTS

Figure 1:
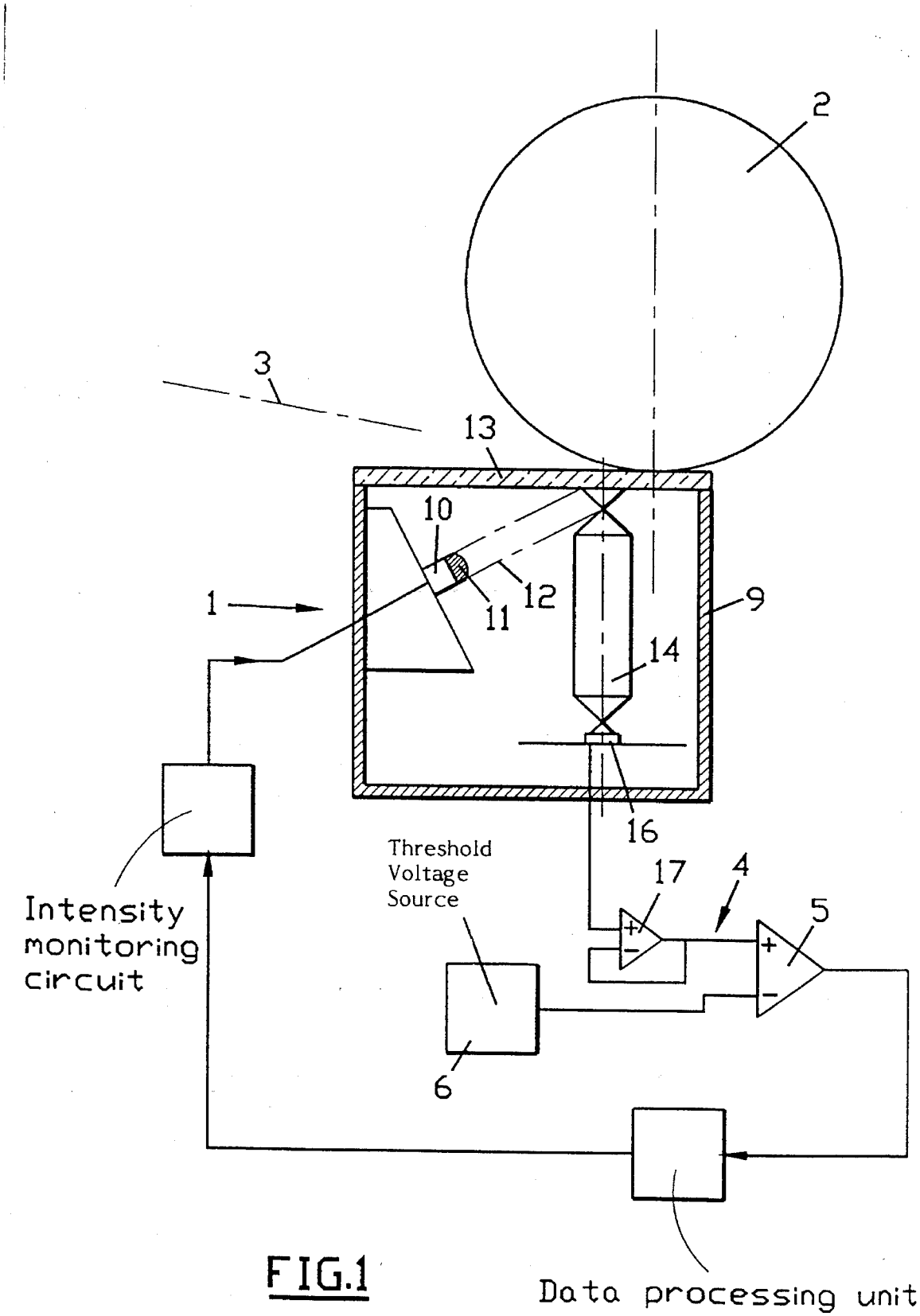
FIG. 1 is a diagrammatic view of a device for analyzing information carriers and to which the invention is applied.

Represented diagrammatically in FIG. 1 is a device for analyzing information carriers, to which the compensation means according to the invention are intended to be applied.

This device includes principally an image detector 1 arranged facing a roller 2 for driving a document 3 to be analyzed.

The roller 2 is linked to a stepper electric motor, not represented, intended to allow analysis of the document 3 by successive scan lines having a vertical resolution which depends on the stepping adopted for the displacement of the roller 2.

The image detector 1 is connected to a data processing device 4 which includes, among other things, a comparator 5 connected between the data output of the image detector and the input of a unit 7 for processing the output signals from the comparator 5 whose output is connected to an input of the data processing unit 7.

The data processing unit 7 is connected on the one hand to a control circuit, not represented, of the stepper motor for driving the roller 2 and on the other hand to a luminous intensity monitoring circuit 8.

The output of the monitoring circuit 8 is connected to the image detector device 1 in the manner which will be described hereafter.

The image detector 1 includes a housing 9 of parallelepipedal shape, in which is mounted a row of light-emitting diodes 10, their number depending on the horizontal resolution and on the luminous intensity which are required.

With these diodes 10 are associated light focusing and filtering modules 11 intended for focusing the beams 12 onto a transparent wall 13 of the housing 9 of the detector, against which wall is to be applied the face of the document 3 to be analyzed which in the case of a gaming coupon bears on the one hand fixed inscriptions such as a gaming grid, box indices for the grid, date indications and the like, printed in the color of the emitted light and which will therefore not be reproduced by the device and on the other hand variable inscriptions made by the player in the gaming grid in a color different from that of the emitted light, as well as fixed inscriptions such as alignment tags, a code relating to the type of game to which the coupon belongs printed in a color different from that of the emitted light and which will be reproduced.

Facing the region for focusing the beams emitted by the light-emitting diodes 10, are arranged light conductors 14 for transmitting the beams 12 to photosensitive elements 16.

The photosensitive elements 16 are each connected by way of an amplifier 17 to an input of a comparator 5 whose other input is connected to the source 6 of reference threshold voltage Vs.

The output of the circuit 8 for monitoring luminous intensity is connected to the light-emitting diodes 10.

In a preferred embodiment, the image detector includes 36 light-emitting diodes with which are associated 1728 photosensitive elements.

If all the photosensitive elements are assumed to be lit simultaneously with a uniform light, and if a uniform white paper is placed between the roller 2 and the transparent surface 13 of the housing 9 of the image detector device, provided that the photosensitive elements 16 are perfect, an identical level is obtained for all these photosensitive elements.

Now, it turns out that neither the emitters nor the photosensitive elements are perfect.

In betting terminals, such as the terminal described in particular in French Patent Application No. 92 11 275 filed on Sep. 22, 1992 by the applicant, the reading of crosses registered on coupons is undertaken with a so-called color blind image detector device operating on the principle of contrast detection.

The output signals from the photosensitive elements of the image detector whose level is below a threshold Vs correspond to a black pixel, whereas the signals whose level is above the aforesaid threshold correspond to white pixels.

The problem which arises is that the sensitivity of the assemblies consisting of the light-emitting diode/photosensitive element pairs is not constant.

Therefore it is required to undertake a correction of the output signals from the photosensitive elements.

Figure 2:
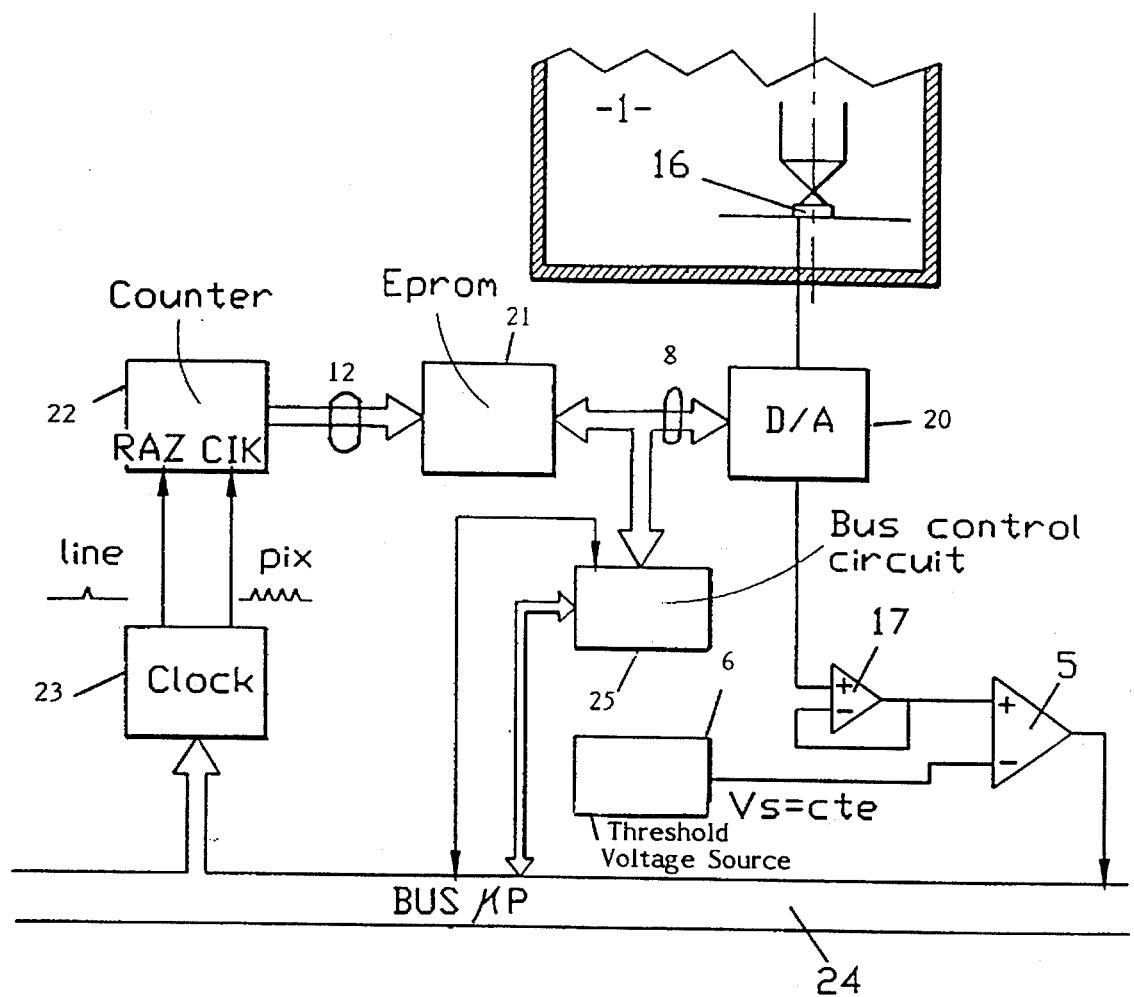
FIG. 2 is a schematic diagram of the device of FIG. 1 provided with means of uniformization of the output signals from the photosensitive elements of the device for analyzing information carriers according to the invention.

The circuit represented in FIG. 2 allows such a correction to be provided for.

This circuit is interposed between the photosensitive elements 16 and the amplifier 17 associated with the comparator 5 of the data processing device 4 represented in FIG. 1.

It essentially includes a multiplier digital/analog converter 20 connected between the photosensitive elements 16 and the aforesaid amplifier 17.

Figure 3:
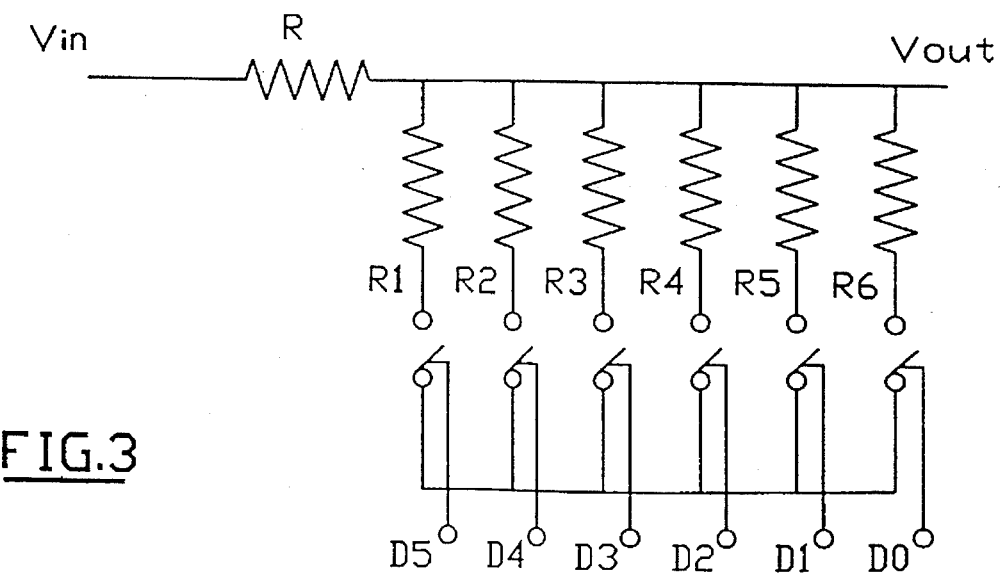
FIG. 3 is an electrical diagram of the digital/analog converter used in the circuit of FIG. 2.

With this multiplier digital/analog converter which will be described in further detail with reference to FIG. 3, is associated a memory 21 such as an EPROM or RAM memory for example, whose address input is linked to a counter 22 such as an 11-bit counter for example connected in turn to a clock circuit 23 which applies signals to the reset-to-zero input RTZ and clock input CLK of the counter 22.

The clock circuit 23 is connected to a microprocessor bus 24.

The circuit also includes a three-state bus control circuit 25 linked via an eight-line conductor between the memory 21 and the multiplier analog/digital converter 20.

The circuit 25 is moreover linked to the microprocessor bus 24.

The output of the comparator 5 is linked to the microprocessor bus 24 which forms part of the processing unit 7 (FIG. 1).

In the present example, the circuit of FIG. 2 and more particularly the digital/analog converter 20 which it includes is connected between the photosensitive elements 16 of the image detector device 1 and the comparator 5 of the output of these photosensitive elements with the threshold voltage Vs.

However, this circuit can also be connected between the threshold voltage source 6 and the corresponding input of the comparator 5 or else to the output of the circuit 8 for monitoring the luminous intensity of the light-emitting diodes 10.

The operation of the circuit of FIG. 2 is as follows.

A logic entity, not represented, programs the clock 23 so that it generates signals LINE CLK and PIXEL CLK. These signals being applied to the counter 22 or more particularly to its RTZ and CLK inputs, the counter undertakes an incrementation for each pixel of the 1728 image detector.

The outputs from the counter, which in the present example are 12 in number, make up the addresses of the memory 21 which is a 2K×8 RAM, for example, or an EPROM.

In read mode, for each CLK pixel of the counter 22, the address of the memory 21 changes and the memory dispatches, on its data output, a value to the digital/analog converter 20. The multiplier digital/analog converter executes a multiplication between this stored value and the output signal from the corresponding photosensitive element 16. The aforesaid operation is repeated until the 1728 photosensitive elements 16 have been taken into account.

In the write mode, a gauge carrier with constant coefficient of reflection is used in place of the carrier to be analyzed.

An algorithm makes it possible to load, for each pixel of the image detector device in the memory 21, a compensation value enabling the comparator 5 to change state when the output signal from the photosensitive element 16 associated with the diodes 10 attains the threshold value Vs delivered by the threshold voltage source 6 after this output signal has been compensated so as to take account of the imprecision in the response of the photosensitive element associated with the light-emitting diode.

The digital/analog converter 20 can be either a linear converter or a nonlinear converter.

In an eight-bit linear system, the digital value of the digital/analog converter lies between 0/255 and 255/255, in steps of 1/255.

A table is thus obtained which is loaded into the memory 21, the values of this table corresponding to the values of the correction of each pixel, that is to say of each light-emitting diode/photosensitive element pair, in order to obtain a homogeneous response of all the pixels of the image detector.

However, the use is preferred of a nonlinear analog/digital converter, the construction of which will now be described with reference to FIG. 3.

This converter includes an input resistor R connected between its input and its output.

The input resistor R of the converter is linked to resistors R1, R2, R3, R4, R5 and R6 connected in parallel with the interposition in series with each resistor of a controlled switch D0, D1, D2, D3, D4, and D5.

The resistors R1 to R6 have values related to those of the resistor R through the following relations:

R1=R/2

R2=R

R3=2R

R4=4R

R5=8R

R6=16R

Of course, the number of these resistors can differ depending on the resolution and attenuation which are desired.

The control electrodes of the switches D0 to D5 of the digital/analog converter 20 are connected to the corresponding data output bits B0 to B5 of the memory 21.

The relation which relates the output voltage Vout to the input voltage Vin of the nonlinear analog/digital converter of FIG. 3 is as follows:

$$Vout = Vin \times \frac{\frac{R}{(B5 \times 2 + B4 + B3/2 + B2/4 + B1/8 + B0/16)}}{\frac{R}{(B5 \times 2 + B4 + B3/2 + B2/4 + B1/8 + B0/16)} + R}$$

with B=0 and 1
and B0–B5 are the output bits of memory (21).

Figure 4:
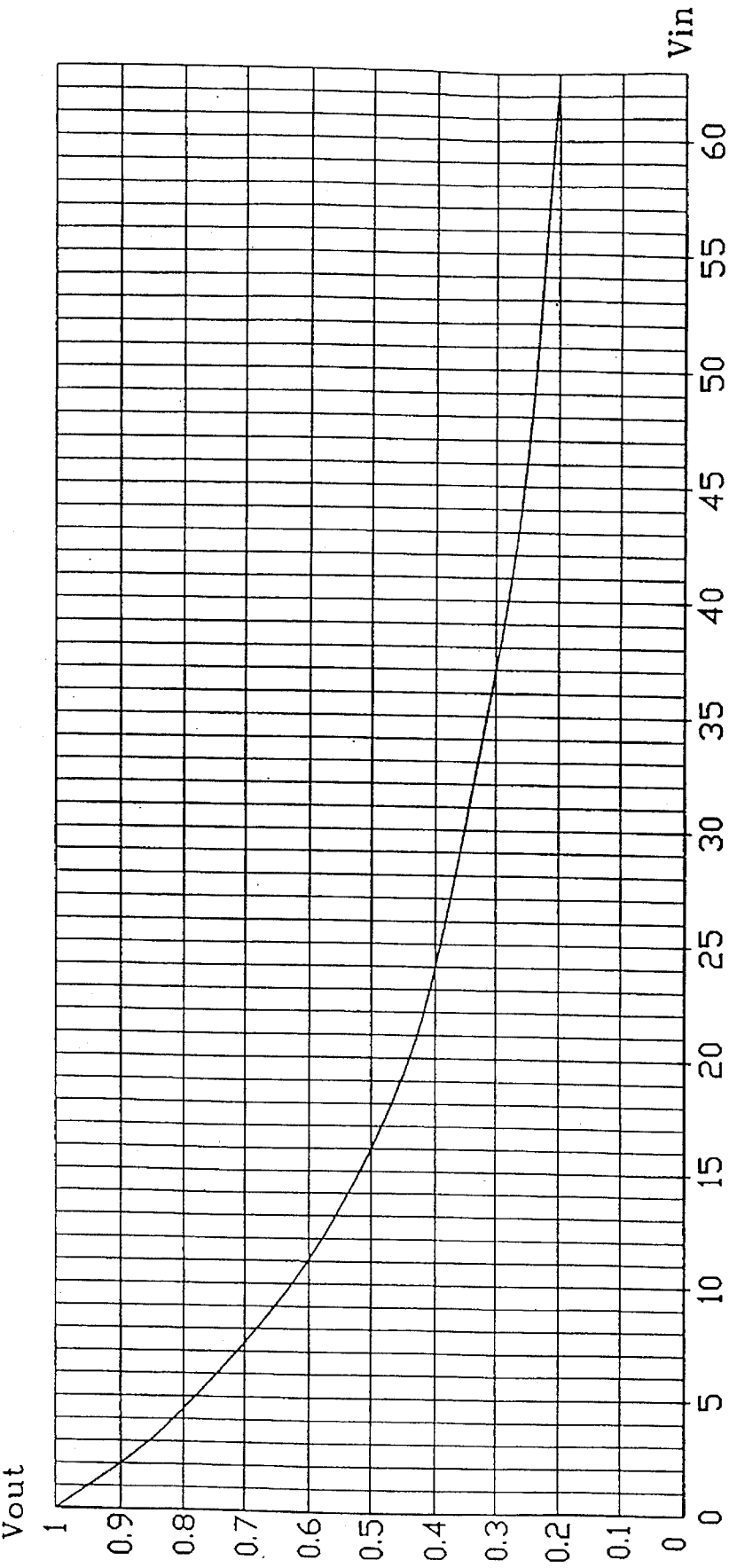
FIG. 4 is a response curve for the converter of FIG. 3.

The response curve of the multiplier analog/digital converter of FIG. 3 is represented in FIG. 4 where it is seen that with six resistors in parallel R1 to R6, corresponding to 6 output bits of the memory 21, there are 64 voltage tiers available.

Figure 5:
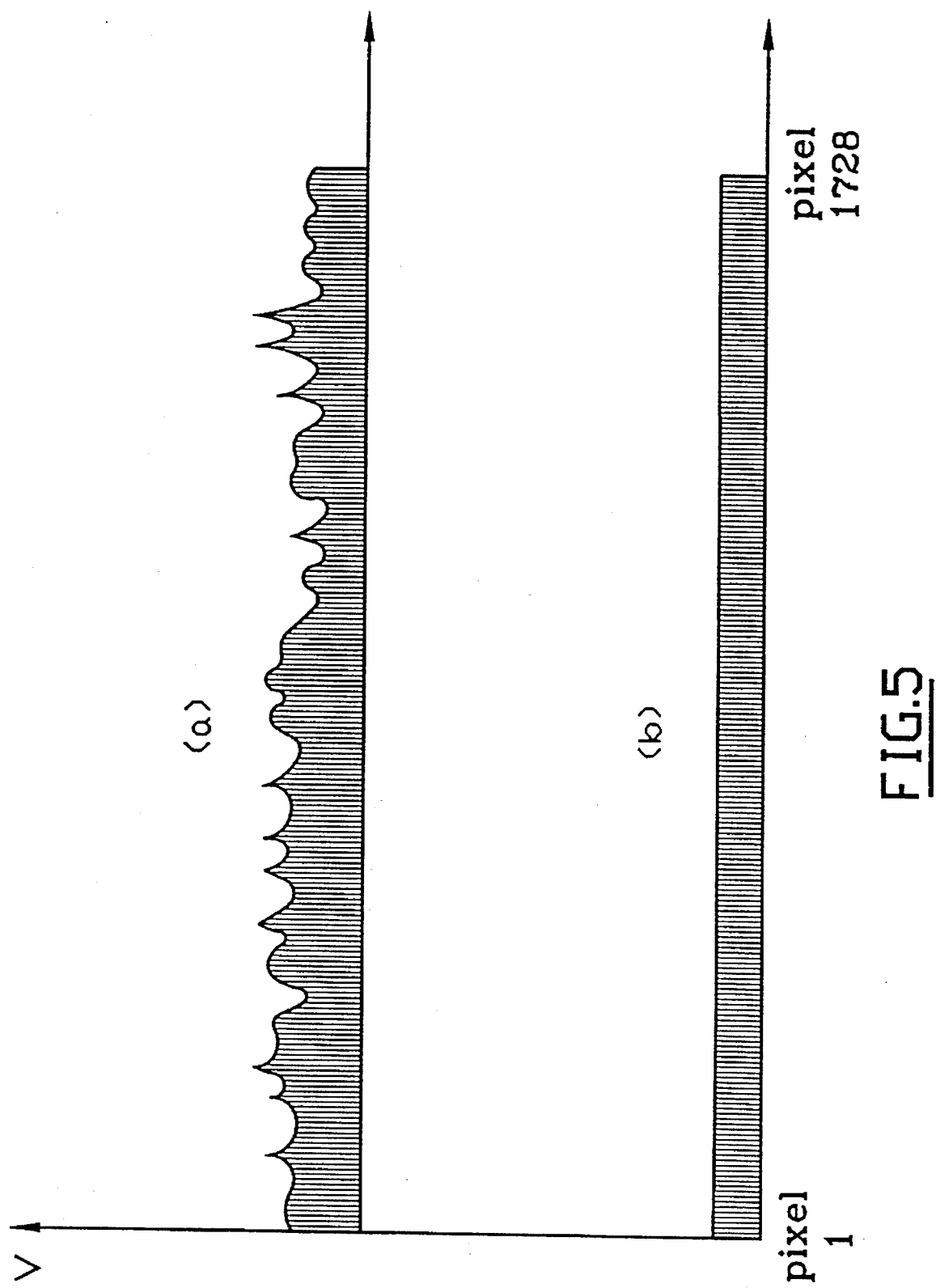
FIG. 5 is a graphic showing the response curve of an mage reading device without the compensation means and with the compensation means according to the invention.

Represented in FIG. 5, in (a), is the response curve of an image detector device without the compensation means according to the invention and, in (b), the response curve of this detector with the said compensation means.

It is observed, on comparing these two curves, that the compensation means according to the invention make it possible to gain in terms of uniformity of the response over the whole length of the image detector device.

Indeed, it is seen in curve (b) that the response signals from the assembly of photosensitive elements of the image detector device are almost constant to within a few exceptions.

What is claimed is:

1. A device for analyzing information carriers comprising an image detector (1) including, in a housing (9), a series of light sources (10) each of which is associated a photosensitive element (16), the light sources (10) and the photosensitive elements (16) being arranged in two rows along the length of the image detector (1), the device furthermore comprising a threshold voltage source (6) and means (5) for comparing the output signals from each of the photosensitive elements (16) with the threshold voltage (Vs) of said threshold voltage source (6), characterized in that it moreover includes compensation means (20, 21, 22, 23, 24, 25) for adjusting each of the output signals to compensate for parameters including the responsiveness of each photosensitive element (16) and the intensity of the light signal emitted by the associated light source (10) in order to obtain a uniform response from all the light source (10)/photosensitive elements (16) pairs of the image detector (1).

2. The device for analyzing information carriers according to claim 1, characterized in that said compensation means comprise at least one memory (21) for storing correction values for at least one of said parameters relating to each light source (10)/photosensitive element (16) pair and parameter modification means (20) for modifying said at least one of said outputs as a function of the corresponding correction values contained in said memory (21).

3. The device for analyzing information carriers according to claim 2, characterized in that said parameter modification means comprise a multiplier digital/analog converter (20) connected to the output of each photosensitive element (16) and/or to the output of the threshold voltage source (6) and/or to the output of a circuit (8) for monitoring the luminous intensity of each of the light sources (10).

4. The device for analyzing information carriers according to claim 3, characterized in that the digital/analog converter (20) is of the linear or nonlinear type.

5. The device for analyzing information carriers according to claim 4, characterized in that the nonlinear multiplier digital/analog converter comprises an input resistor (R) connected between the input and the output of the converter and resistors (R1, R2, R3, R4, R5, R6) connected in parallel to the output of the converter with interposition of a controlled switch (D0, D1, D2, D3, D4, D5) having a control port in series with each of the parallel resistors, the control port of each switch being linked to a corresponding data output of the memory (21).

6. The device for analyzing information carriers according to claim 5, characterized in that the values of the parallel resistors of the digital/analog converter (20) are related to the value of the input resistor (R) through the relations:

R1=R/2

R2=R

R3=2R

R4=4R

R5=8R

R6=16R and in that the output signal Vout from the converter (20) is related to its input signal Vin through the relation:

$$Vout = Vin \times \frac{\frac{R}{(B5 \times 2 + B4 + B3/2 + B2/4 + B1/8 + B0/16)}}{\frac{R}{(B5 \times 2 + B4 + B3/2 + B2/4 + B1/8 + B0/16)} + R}$$

with B=0 or 1 and B0–B5 are output bits of said memory (21).

7. The device for analyzing information carriers according to claim 2, characterized in that it furthermore includes a counter (22) controlled by a clock (23) in order to provide for the addressing of the memory (21) for the application by the latter of the correction data corresponding to the successive light source (10)/photosensitive element (16) pairs of the image detector (1).

8. A device for analyzing information carriers according to claim 3, characterized in that it furthermore includes a counter (22) controlled by a clock (23) in order to provide for the addressing of the memory (21) for the application by the latter of the correction data corresponding to the successive light source (10)/photosensitive element (16) pairs of the image detector (1).

9. The device for analyzing information cariers according to claim 4, characterized in that it furthemore includes a counter (22) controlled by a clock (23) in order to provide for the addressing of the memory (21) for the application by the latter of the correction data corresponding to the successive light source (10)/photosensitive element (16) pairs of the image detector (1).

10. The device for analyzing information carriers according to claim 5, characterized in that it furthermore includes a counter (22) controlled by a clock (23) in order to provide for the addressing of the memory (21) for the application by the latter of the correction data corresponding to the successive light source (10)/photosensitive element (16) pairs of the image detector (1).

11. The device for analyzing information carriers according to claim 6, characterized in that it furthermore includes a counter (22) controlled by a clock (23) in order to provide for the addressing of the memory (21) for the application by the latter of the correction data corresponding to the successive light source (10)/photosensitive element (16) pairs of the image detector (1).

* * * * *